(12) United States Patent
Kobashi et al.

(10) Patent No.: US 11,447,651 B2
(45) Date of Patent: Sep. 20, 2022

(54) INK SET, INKJET PRINTING DEVICE, AND INKJET PRINTING METHOD

(71) Applicant: RICOH COMPANY, LTD., Tokyo (JP)

(72) Inventors: Toshiyuki Kobashi, Kanagawa (JP); Satoyuki Sekiguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 87 days.

(21) Appl. No.: 17/070,062

(22) Filed: Oct. 14, 2020

(65) Prior Publication Data

US 2021/0115285 A1 Apr. 22, 2021

(30) Foreign Application Priority Data

Oct. 18, 2019 (JP) .............................. JP2019-191214
Sep. 15, 2020 (JP) .............................. JP2020-154864

(51) Int. Cl.
| | | |
|---|---|---|
| *C09D 11/54* | (2014.01) | |
| *C09D 11/40* | (2014.01) | |
| *C09D 11/38* | (2014.01) | |
| *B41M 5/00* | (2006.01) | |
| *C09D 11/102* | (2014.01) | |
| *C09D 11/107* | (2014.01) | |
| *B41M 7/00* | (2006.01) | |
| *C09D 11/322* | (2014.01) | |
| *B41J 2/21* | (2006.01) | |

(52) U.S. Cl.
CPC ............. *C09D 11/54* (2013.01); *B41J 2/2114* (2013.01); *B41M 5/0023* (2013.01); *B41M 7/0018* (2013.01); *C09D 11/102* (2013.01); *C09D 11/107* (2013.01); *C09D 11/322* (2013.01); *C09D 11/38* (2013.01); *C09D 11/40* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 3/4078; B41J 11/0021; B41J 11/002; B41J 25/001; B41J 25/34; B41J 25/003; B41J 25/312; B41J 2025/008; B41J 2202/21; B41J 2/17596; B41J 2/16508; B41J 2/1652; B41J 2/16538; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 2/1623; B41J 2202/00; B41J 2202/03; B41J 2/14201; B41J 2/045; B41J 11/0015; B41J 2/04581; B41J 2/055; B41J 2002/16502; B41J 2/04588; B41J 2/04595; B41J 2/04586; B41J 2/14274; C09D 11/326; C09D 11/107; C09D 11/03; C09D 11/037; C09D 11/033; B41F 23/042; B41F 23/0436; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2010/0091052 A1* | 4/2010 | Ogawa | .................. | C09D 11/322 347/100 |
| 2013/0307912 A1* | 11/2013 | Masuda | ............... | C09D 11/322 347/100 |
| 2015/0054883 A1* | 2/2015 | Okuda | .................. | C09D 11/322 347/20 |
| 2016/0194824 A1* | 7/2016 | Ohashi | ................. | C09D 11/322 347/20 |
| 2017/0210926 A1* | 7/2017 | Kawamura | ................ | B41J 2/01 |
| 2017/0210927 A1* | 7/2017 | Kawamura | ................ | B41J 2/01 |
| 2017/0267889 A1* | 9/2017 | Katsuragi | .................. | B41J 2/01 |

FOREIGN PATENT DOCUMENTS

| | | |
|---|---|---|
| JP | 2003-080839 | 3/2003 |
| JP | 2004-276253 | 10/2004 |
| JP | 2009-030014 | 2/2009 |
| JP | 2017-136847 | 8/2017 |
| JP | 2017-171874 | 9/2017 |
| JP | 2018-123235 | 8/2018 |

* cited by examiner

*Primary Examiner* — Manish S Shah
(74) *Attorney, Agent, or Firm* — Grüneberg and Myers PLLC

(57) ABSTRACT

An ink set contains a pre-processing fluid containing a multivalent metal ion, a first ink and a second ink, wherein the first ink has a surface tension of 35 mN/m or greater at 25 degrees C. and a life time of 150 ms, wherein the second ink has a surface tension of 35 mN/m or greater at 25 degrees C. and a life time of 150 ms and the second ink is a white ink.

14 Claims, 2 Drawing Sheets

INK SET, INKJET PRINTING DEVICE, AND INKJET PRINTING METHOD

CROSS-REFERENCE TO RELATED APPLICATIONS

This patent application is based on and claims priority pursuant to 35 U.S.C. § 119 to Japanese Patent Application Nos. 2019-191214 and 2020-154864, filed on Oct. 18, 2019 and Sep. 15, 2020, respectively, in the Japan Patent Office, the entire disclosures of which are hereby incorporated by reference herein.

BACKGROUND

Technical Field

The present disclosure relates to an ink set, an inkjet printing device, and an inkjet printing method.

Description of the Related Art

Since inkjet printers are relatively quiet, have low running costs, and are capable of printing color images with ease, they are now widely used at home to output digital information.

In addition to home use, inkjet recording is required to support printing on poorly permeable media such as coated paper, impermeable media such as plastic film, and fabrics such as woven fabrics and knitted fabrics with an image quality level on a par with that of the existing analog printing.

In the food packaging field called soft packaging, high-mix low volume production of print jobs is rapidly progressing and the needs for variable printing is increasing. Such demand accelerates development of an inkjet recording system capable of printing on soft packaging film such as polyolefin-based, polyester-based, and polyamide-based film.

Like the soft packaging field, the market of direct printing on clothes such as T-shirts, so called direct to garment (DTG), is expanding year by year in the dyeing business. On the rise of personal recommendation business in apparel business and the trend of the active collaboration with fine art appearing in the interior textile field, the needs for an inkjet recording system capable of printing images with excellent coloring and robustness on fabric is boosting.

Inks using a low volatile compounds and aqueous inks for such fabric is now most actively developed for safety.

In the DTG field, it is common that a white ink is applied to dark color fabric 30 to 60 seconds before a color ink is applied onto the white ink layer. Development of a new technology to shorten this time lag between the application of a white ink and the application of a color ink is now in full swing to enhance productivity.

SUMMARY

According to embodiments of the present disclosure, an ink set is provided which contains a pre-processing fluid, a multivalent metal ion, a first ink and a second ink, wherein the first ink has a surface tension of 35 mN/m or greater at 25 degrees C. and a life time of 150 ms, wherein the second ink has a surface tension of 35 mN/m or greater at 25 degrees C. and a life time of 150 ms and the second ink is a white ink.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
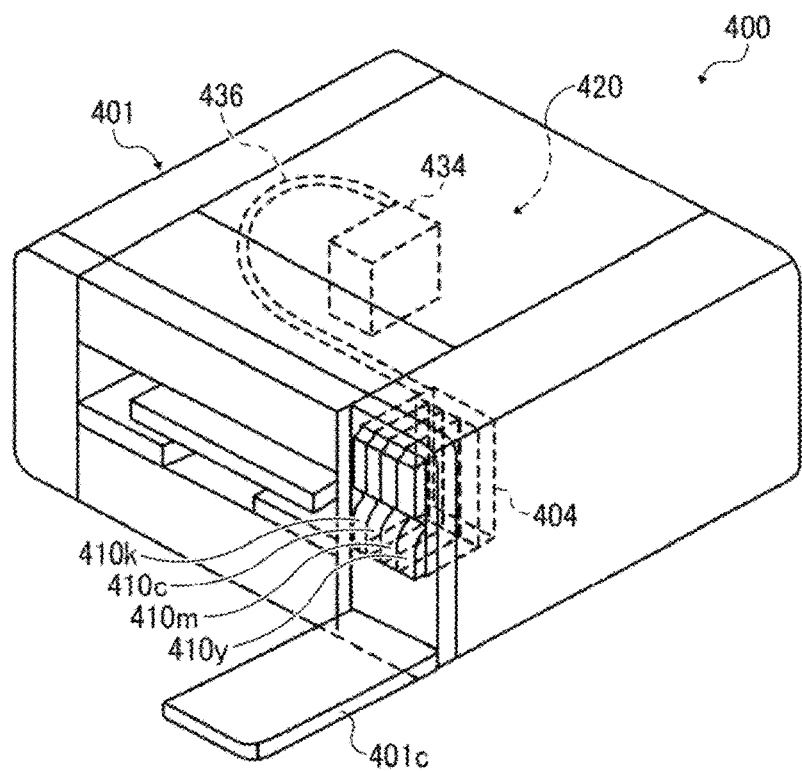
FIG. 1 is a diagram illustrating a perspective view of an example of an inkjet recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, an ink set is provided which strikes a balance between high image quality and high white concealing ability even for an image created with color ink applied to a white ink layer immediately after the white ink layer is formed.

The present disclosure relates to the following (1) and also includes the following (2) to (9) as embodiments.

(1) An ink set contains a pre-processing fluid comprising a multivalent metal ion. a first ink, and a white ink, wherein the first ink has a surface tension of 35 mN/m or greater at 25 degrees C. and a life time of 150 ms, wherein the white ink has a surface tension of 35 mN/m or greater at 25 degrees C. and a life time of 150 ms.

(2). The ink set according to (1) mentioned above, wherein the surface tension at 25 degrees C. and a life time of 150 ms of the first ink is equal to or greater than the surface tension at 25 degrees C. and a life time of 150 ms of the white ink.

(3). The ink set according to (1) or (2) mentioned above, wherein the difference between the surface tension at 25 degrees C. and a life time of 150 ms of the first ink is equal to or greater than the surface tension at 25 degrees C. and a life time of 150 ms of the white ink is 10 mN/m or less.

(4). The ink set according to any one of (1) to (3) mentioned above, wherein the difference between the surface tension at 25 degrees C. and a life time of 150 ms of the first ink and the surface tension at 25 degrees C. and a life time of 150 ms of the white ink is 5 mN/m or less.

(5). The ink set according to any one of (1) to (4) mentioned above, wherein the pre-processing fluid contains a silicone-based surfactant in an amount of from 0.001 to 1.000 percent by mass.

(6). The ink set according to any one of (1) to (5) mentioned above, wherein the surface tension at 25 degrees C. and a life time of 150 ms of the white ink is 40 mN/m or greater.

(7). The ink set according to any one of (1) to (6) mentioned above, wherein the first ink contains a silicone-based surfactant.

(8). An inkjet printing device includes the ink set according to any one of (1) to (7) mentioned above, at least one container containing the ink set, an applicator configured to apply a pre-processing fluid, and at least one discharging device configured to discharge an ink.

(9). An inkjet printing method includes applying a pre-processing fluid containing a multivalent metal ion to a recording medium, discharging a first ink and a white ink to a portion where the pre-processing fluid has been applied to the recording medium, wherein the first ink has a surface tension of 35 mN/m or greater at 25 degrees C. and a life time of 150 ms, wherein the white ink has a surface tension of 35 mN/m or greater at 25 degrees C. and a life time of 150 ms.

The ink set of the present disclosure contains a pre-processing fluid containing a multivalent metal ion, a first ink, and a white ink, wherein the first ink has a surface tension of mN/m or greater at 25 degrees C. and a life time of 150 ms, wherein the white ink has a surface tension of 35 mN/m or greater at 25 degrees C. and a life time of 150 ms.

Pre-Processing Fluid

The pre-processing fluid for use in the present disclosure contains a multivalent metal ion.

Such a multivalent metal ion can be selected from known metal ions and includes a calcium ion, magnesium ion, and aluminum ion. These can be used alone or in combination.

The pre-processing fluid can contain the multivalent metal ion by dissolving a water-soluble multivalent metal salt.

Such a water-soluble multivalent metal salt can be selected from known metal ions and includes, but is not limited to, a salt of carboxylic acid such as acetic acid and lactic acid, sulfate, nitrate, hydrochloride, and thiocyanate. Those multivalent metal salts can be used alone or in combination. Of these, carboxylate, sulfates, nitrates, and hydrochlides, which have good water-solubility and solubility in an organic solvent, are preferable to enhance white concealing ability and the quality of an image created with color ink immediately after printing with white ink.

The multivalent metal ion in the pre-processing fluid is preferably from 2 to 40 g/L, more preferably from 4 to 30 g/L, and furthermore preferably from 8 to 20 g/L.

The pre-processing fluid preferably contains a silicone-based surfactant to enhance white concealing ability and improve the quality of an image created with color ink immediately after printing with white ink.

The silicone-based surfactant is not particularly limited and can be suitably selected to suit to a particular application. The silicone-based surfactant is preferably the compound represented by Chemical Formula 2 to achieve good white concealing ability and prevent blurring.

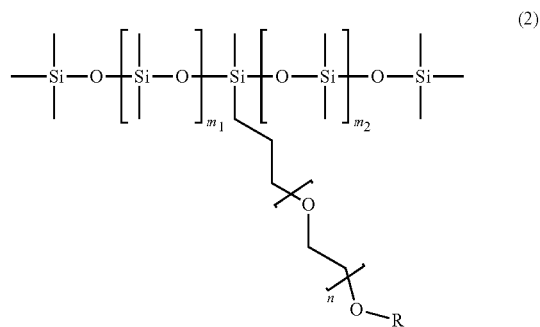

(2)

In Chemical Formula 2, R represents a hydrogen atom or methyl group, $m_1$ and $m_2$ respectively represent zero or integers of from 1 to 6, and n represent an integer of from 2 to 20.

R in Chemical Formula 2 is preferably a hydrogen atom to achieve good storage stability and uniformity or a methyl group to prevent blurring. It is more preferable to use both in combination.

Specific examples of the silicone surfactants include, but are not limited to, 71 ADDITIVE, 74 ADDITIVE, 57 ADDITIVE, 8029 ADDITIVE, 8054 ADDITIVE, 8211 ADDITIVE, 8019 ADDITIVE, 8526 ADDITIVE, FZ-2123, and FZ-2191 (all manufactured by Dow Corning Toray Co., Ltd.), TSF4440, TSF4441, TSF4445, TSF4446, TSF4450, TSF4452, and TSF4460 (all manufactured by Momentive Performance Materials Inc. Silface SAG002, Silface SAG003, Silface SAG005, Silface SAG013, Silface SAG503A, Silface SAG008, and Silface SJM003 (all manufactured by Nissin Chemical co., ltd.), TEGO Wet KL245, TEGO Wet 240, TEGO Wet 250, TEGO Wet 260, TEGO Wet 265, TEGO Wet 270, and TEGO Wet 280 (all manufactured by Evonik), and BYK-345, BYK-347, BYK-348, BYK-349, BYK-375, and BYK-377 (all manufactured by BYK Japan KK.).

Of these, the silicone surfactants represented by Chemical Formula 2 illustrated above include, but are not limited to, BYK-345, 347, 348, and 349 (all manufactured by BYK Japan KK., TEGO Wet 240, TEGO Wet 270, and TEGO Wet 280 (all manufactured by Evonik), and Silface SAG002, Silface SAG013, and Silface SAG503A (all manufactured by Nissin Chemical co., ltd.).

The proportion of the silicone-based surfactant in the pre-processing fluid is not particularly limited and can be suitably selected to suit to a particular application. It is preferably from 0.001 to 1.000 percent by mass, more preferably from 0.005 to 0.500 percent by mass, and furthermore preferably from 0.010 to 0.200 percent by mass to enhance white concealing ability and prevent blurring.

How the pre-processing fluid is applied is not particularly limited and can be suitably selected from known methods such as roller application, dipping, spray application, and inkjet application depending on a particular application.

The amount of the pre-processing fluid applied per unit of area is preferably from 1-0.02 to 200 mg/cm² to achieve high white concealing ability and enhance the quality of images created with color ink on a white ink layer immediately after the white ink layer is formed. It is preferable from 10 to 100 mg/cm² when the pre-processing fluid is applied with a spray or roller and from 0.04 to 4.0 mg/cm² when the pre-processing fluid is discharged and applied with inkjetting.

The pre-processing fluid preferably contains a resin to enhance robustness. The resin can be suitably selected from known resins, preferably from nonionic resins such as polyvinyl pyrrolidone, polyvinyl alcohol, and polyethylene glycol and resins such as urethanre resins, acrylic resins, and polyester resins containing the structure unit represented by Chemical Formula 1.

    Chemical Formula 1 n represents an integer of from 5 to 100.

The proportion of the resin in the pre-processing fluid is preferably from 0.01 to 30 percent by mass and more preferably from 0.1 to 15 percent by mass.

The pre-processing fluid may contain an organic solvent, defoaming agent, fungicide, and corrosion inhibitor to suit to a particular application. These components are described in detail later.

Each of the first ink and the second ink has a surface tension of 35 mN/m or greater, preferably 40 mN/m or greater, and more preferably 45 mN/m or greater, at 25 degrees C. and a life time of 150 ms. A surface tensionless than 35 mN/m at 25 degrees C. and a lifetime of 150 ms tends to cause blurring of color ink so that the quality of an image created with the color ink applied to a white ink layer immediately after the white ink layer is formed. The white concealing ability is further enhanced when the second ink has a surface tension of 40 mN/m or greater at 25 degrees C. and a life time of 150 ms.

The second ink is white ink and the first ink is color ink as described above.

The first ink may be multiple types containing different types of coloring materials and all of the first inks preferably have a surface tension of 35 mN/m or greater at 25 degrees C. and a life time of 150 ms.

The surface tension at 25 degrees C. and a life time of 150 ms of the first ink is preferably equal to or greater than the surface tension at 25 degrees C. and a life time of 150 ms of the second ink in the present disclosure. Blurring and feathering of the first ink occur less under this condition.

The difference between the surface tension at 25 degrees C. and a life time of 150 ms of the first ink and the surface tension at 25 degrees C. and a life time of 150 ms of the second ink is preferably 10 mN/m or less in the present disclosure. Blurring and feathering of the first ink occur less under this condition. When this difference is 5 mN/m or less, blurring and feathering of the first ink are further reduced under the condition.

The pigment for use in the second ink is not particularly limited and can be suitably selected to suit a particular application. Titanium oxide is particularly preferable.

The pigment for use in the first ink is not particularly limited and can be suitably selected to suit a particular application.

These components are described in detail later.

The first ink preferably contains a silicone-based surfactant to produce images with good coloring. Such a surfactant further enhances the image quality (coloring).

The silicone-based surfactant is not particularly limited and can be suitably selected to suit to a particular application. The silicone-based surfactant is preferably the compound represented by Chemical Formula 2 to achieve good coloring.

Chemical Formula 2

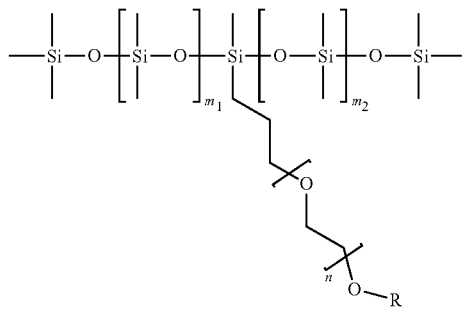

In Chemical Formula 2, R represents a hydrogen atom or methyl group, m1 and m2 respectively represent zero or integers of from 1 to 6, and n represent an integer of from 2 to 20.

R in Chemical Formula 2 is preferably a hydrogen atom to achieve good storage stability and uniformity or a methyl group to prevent blurring. It is more preferable to use both in combination.

Specific examples of the silicone surfactants include, but are not limited to, 71 ADDITIVE, 74 ADDITIVE, 57 ADDITIVE, 8029 ADDITIVE, 8054 ADDITIVE, 8211 ADDITIVE, 8019 ADDITIVE, 8526 ADDITIVE, FZ-2123, and FZ-2191 (all manufactured by Dow Corning Toray Co., Ltd.), TSF4440, TSF4441, TSF4445, TSF4446, TSF4450, TSF4452, and TSF4460 (all manufactured by Momentive Performance Materials Inc. Silface SAG002, Silface SAG003, Silface SAG005, Silface SAG013, Silface SAG503A, Silface SAG008, and Silface SJM003 (all manufactured by Nissin Chemical co., ltd.), TEGO Wet KL245, TEGO Wet 240, TEGO Wet 250, TEGO Wet 260, TEGO Wet 265, TEGO Wet 270, and TEGO Wet 280 (all manufactured by Evonik), and BYK-345, BYK-347, BYK-348, BYK-349, BYK-375, and BYK-377 (all manufactured by BYK Japan KK.).

Of these, the silicone surfactants represented by Chemical Formula 2 illustrated above include, but are not limited to, BYK-345, 347, 348, and 349 (all manufactured by BYK Japan KK., TEGO Wet 240, TEGO Wet 270, and TEGO Wet 280 (all manufactured by Evonik), and Silface SAG002, Silface SAG013, and Silface SAG503A (all manufactured by Nissin Chemical co., ltd.).

In addition, the proportion of the silicone-based surfactant in the first ink is not particularly limited and it can be suitably selected to suit to a particular application. It is preferably from 0.01 to 0.50 percent by mass and more preferably from 0.02 percent by mass to 0.30 percent by mass to achieve good coloring.

The surface tension of each of the first ink and the second ink is 35 mN/m or greater at 25 degrees C. and a life time of 150 ms in the present disclosure. The surface tension means dynamic surface tension.

The dynamic surface tension can be controlled by changing the type and the amount of a surfactant added to the ink.

Dynamic surface tension can be measured by known methods. It is preferable to employ the maximum bubble pressure technique in the present disclosure, Instruments employing the maximum bubble pressure technique for measuring dynamic surface tension instrument are procurable. A specific example is DynoTester (manufactured by SITA Messtechnik GmbH).

In the maximum bubble pressure technique, the surface tension is obtained from the maximum pressure required to discharge the air bubbles from the front portion of a probe immersed in a target liquid (ink).

The maximum pressure is shown when the radius of the air bubbles is equal to the radius of the front portion of the probe, and the dynamic surface tension σ of the ink is obtained by the following equation.

$$\sigma=(\Delta P\cdot r)/2$$

In the equation, r represents the radius of the front portion of a probe and ΔP represents the difference between the maximum and minimum pressure applied to an air bubble.

The life time means the time from when a new surface is formed after an air bubble is released from a probe to the time when the next maximum bubble pressure appears in the maximum bubble pressure technique.

The pre-processing fluid, the first ink, and the second ink (hereinafter also referred to as ink) are described in detail below.

Ink

The organic solvent, water, coloring material, resin, and additive for use in the ink are described below.

Organic Solvent

There is no specific limitation to the organic solvent for use in the present disclosure. For example, a water-soluble organic solvent can be used. Examples include, but are not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutyl ether, diethylene glycol monomethylether, diethylene glycol monoethylether, diethylene glycol monobutyl ether, tetraethylene glycol monomethylether, and propylene glycol monoethylether, polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

It is preferable to use an organic solvent having a boiling point of 250 or lower degrees C., which serves as a humectant and imparts a good drying at the same time.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyhydric alcohol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether and polyhydric alcohol arylethers such as ethylene glycol monophenylether and ethylene glycol monobenzylether.

The proportion of the organic solvent in the ink has no particular limit and can be suitably selected to suit to a particular application.

In terms of drying and discharging reliability of the ink, the proportion is preferably from 10 to 60 percent by mass and more preferably from 20 to 60 percent by mass.

Water

The proportion of water of the ink is not particularly limited and can be suitably selected to suit to a particular application. For example, in terms of enhancing the drying and discharging reliability of the ink, the proportion is preferably from 10 to 90 percent by mass and more preferably from 20 to 60 percent by mass.

Coloring Material

The coloring material has no particular limitation and includes materials such as a pigment and a dye.

The pigment includes an inorganic pigment or an organic pigment. These can be used alone or in combination. In addition, a mixed crystal can also be used as the coloring material.

Examples of the pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as the inorganic pigment in addition to titanium oxide, iron oxide, calcium carbonate, barium sulfate, aluminum hydroxide, barium yellow, cadmium red, and chrome yellow.

Specific examples of the organic pigment include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51, C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63, C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably from 0.1 to 15 percent by mass and more preferably from 1 to 10 percent by mass in terms of enhancement of image density, fixability, and discharging stability.

The ink is obtained by introducing a hydrophilic functional group into a pigment to prepare a self-dispersible pigment, coating the surface of a pigment with a resin followed by dispersion, or using a dispersant to disperse a pigment.

One way of preparing a self-dispersible pigment by introducing a hydrophilic functional group into a pigment is to add a functional group such as a sulfone group and carboxyl group to a pigment (e.g., carbon) to disperse the pigment in water.

One way of dispersing a resin by coating the surface thereof is to encapsulate a pigment in a microcapsule to make it disperse in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

When a dispersant is used, a known dispersant having a small or large molecular weight represented by a surfactant is used.

It is possible to select an anionic surfactant, a cationic surfactant, a nonionic surfactant, an amphoteric surfactant, or others depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix a pigment with water, a dispersant, and other substances to prepare a pigment dispersion and thereafter mix the pigment dispersion with materials such as water and an organic solvent to manufacture an ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be analyzed using a particle size analyzer (Nanotrac Wave-UT151, manufactured by MicrotracBEL Corp).

The proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with an instrument such as filter and a centrifuge to remove coarse particles followed by deaerating.

Resin

The type of the resin contained in the ink has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles made of such resins can be also used. It is possible to mix a resin emulsion in which such resin particles are dispersed in water as a dispersion medium with materials such as a coloring material and an organic solvent to obtain an ink. It is possible to use suitably-synthesized resin particles as the resin particle. Alternatively, the resin particle available on the market can be used. The resin particle can be used alone or in combination.

The mean volume diameter (i.e., volume average particle diameter) of the resin particle is not particularly limited and can be suitably selected to suit to a particular application. The mean volume diameter is preferably from 10 to 1,000 nm, more preferably from 10 to 200 nm, and particularly preferably from 10 to 100 nm to achieve good fixability and image robustness.

The volume average particle diameter can be measured by using, for example, a particle size analyzer (Nanotrac Wave-UT151, manufactured by MicrotracBEL Corp.).

The proportion of the resin in the ink is not particularly limited and can be suitably selected to suit to a particular application. In terms of fixability and storage stability of the ink, it is preferably from 1 to 30 percent by mass and more preferably from 5 to 20 percent by mass of the total amount of the ink.

The particle diameter of the solid portion in the ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes particles such as resin particles and pigment particles. The particle diameter can be measured by using a particle size analyzer (Nanotrac Wave-UT151, manufactured by MicrotracBEL Corp).

Additive

The ink may further optionally include additives such as a surfactant, a defoaming agent, a preservative and fungicide, a corrosion inhibitor, and a pH regulator.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, surfactants not decomposable in a high pH environment are preferable. Examples of the silicone-based surfactants include, but are not limited to, side chain modified polydimethyl siloxane, both terminal-modified polydimethyl siloxane, one-terminal-modified polydimethyl siloxane, and side-chain-both-terminal-modified polydimethyl siloxane. In particular, silicone-based surfactants having a polyoxyethylene group or a polyoxyethylene polyoxypropylene group as a modification group are particularly preferable because such an aqueous surfactant demonstrates good properties. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

A fluorochemical surfactant in which the number of carbon atoms replaced with fluorine atoms is 2 to 16 is preferable and, 4 to 16, more preferable.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain. Of these, polyoxyalkylene ether polymer compounds having a perfluoroalkyl ether group in the side chain thereof are preferable because these polymer compounds do not easily foam and the fluorosurfactant represented by the following Chemical Formula F-1 or Chemical Formula F-2 is more preferable.

$$CF_3CF_2(CF_2CF_2)_m\text{—}CH_2CH_2O(CH_2CH_2O)_nH \quad \text{Chemical Formula F-1}$$

In the Chemical Formula F-1, "m" is preferably 0 or an integer of from 1 to 10 and "n" is preferably 0 or an integer of from 1 to 40.

$$C_nF_{2n+1}\text{—}CH_2CH(OH)CH_2\text{—}O\text{—}(CH_2CH_2O)_a\text{Y} \quad \text{Chemical Formula F-2}$$

In the compound represented by the Chemical Formula F-2, Y represents H or $C_mF_{2m+1}$, where m represents an integer of from 1 to 6, or $CH_2CH(OH)CH_2\text{—}C_mF_{2m+1}$, where m represents an integer of from 4 to 6, or $C_pH_{2p+1}$, where p is an integer of from 1 to 19. n represents an integer of from 1 to 6. a represents an integer of from 4 to 14.

The fluorochemical surfactant is commercially available. Specific examples include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by Sumitomo 3M Limited); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-25, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in the ink is not particularly limited and can be suitably selected to suit to a particular application. For example, the proportion is preferably from 0.001 to 5 percent by mass and more preferably from 0.05 to 5 percent by mass to achieve excellent wettability and discharging stability and improve image quality.

Defoaming Agent

The defoaming agent has no particular limit and examples include, but are not limited to silicon-based defoaming agents, polyether-based defoaming agents, and aliphatic acid ester-based defoaming agents. These can be used alone or in combination. Of these, silicone-based defoaming agents are preferable to achieve the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Examples are acid sulfites and sodium thiosulfates.

pH Regulator

The pH regulator has no particular limit as long as it can control pH to be not lower than 7. Specific examples include, but are not limited to, amines such as diethanol amine and triethanol amine.

Properties of the ink are not particularly limited and can be suitably selected to suit to a particular application. For example, viscosity, surface tension, and pH are preferable in the following ranges. Viscosity of the ink at 25 degrees C. is preferably from 5 to 30 mPa·s and more preferably from 5 to 25 mPa·s because print density and text quality improve and good dischargeability is demonstrated. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount 1.2 mL
Rotational frequency: 50 rotations per minute (rpm)
25 degrees C.
Measuring time: three minutes.

The surface tension of the ink is preferably 35 mN/m or less and more preferably 32 mN/m or less at 25 degrees C. because the ink suitably levels on a recording medium and the drying time of the ink is shortened.

pH of the ink is preferably from 7 to 12 and more preferably from 8 to 11 in terms of prevention of corrosion of metal material in contact with liquid.

Post-Processing Fluid

The post-processing fluid has no particular limit. It is preferable that the post-processing fluid can form a transparent layer. Material such as organic solvents, water, resins, surfactants, defoaming agents, pH regulators, preservatives and fungicides, corrosion inhibitors, etc. is suitably selected based on a necessity basis and mixed to obtain the post-processing fluid. The post-processing fluid can be applied to the entire recording area formed on a recording medium or only the area on which an ink image is formed.

The recording media are not limited to typical recording media and suitably include building materials such as wall paper, floor material, and tiles, cloth for apparel such as T-shirts, textile, and leather. The configuration of the paths through which the recording medium is conveyed can be changed to use materials such as ceramics, glass, and metal.

Recorded Matter

The ink recorded matter of the present disclosure includes a recording medium and an image formed on the recording medium with the ink of the present disclosure.

The recorded matter is obtained by an inkjet recording device executing an inkjet recording method.

The inkjet printing device of the present disclosure includes the ink set of the present disclosure, at least one container containing the ink set, a device (applicator) to apply the pre-processing fluid, and a discharging device to discharge the first ink and the white ink. The inkjet printing method includes applying the pre-processing fluid to a recording medium, discharging the first ink and the white ink to the portion where the pre-processing fluid has been applied to the recording medium. It is preferable to discharge the first ink to the portion where the white ink has been discharged.

Recording Device and Recording Method

The ink the ink set of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices such as 3D printers and additive manufacturing devices.

In the present disclosure, the recording device and the recording method respectively represent a device capable of discharging ink and liquids such as various processing fluids to a recording medium and a method of recording utilizing such a device. The recording medium means an item to which ink or various processing fluids can be temporarily or permanently attached.

The recording device may further optionally include a device relating to feeding, conveying, and ejecting a recording medium and other devices referred to as a pre-processing device, a post-processing device in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. It is possible to heat and dry a recording medium before, during, and after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head moves and a line type device in which the discharging head is not moved, unless otherwise specified.

Furthermore, in addition to the desktop type, this recording device includes a device capable of printing images on a wide recording medium such as A0 and a continuous printer capable of using continuous paper reeled up in a roll form as recording media.

Figure 2:
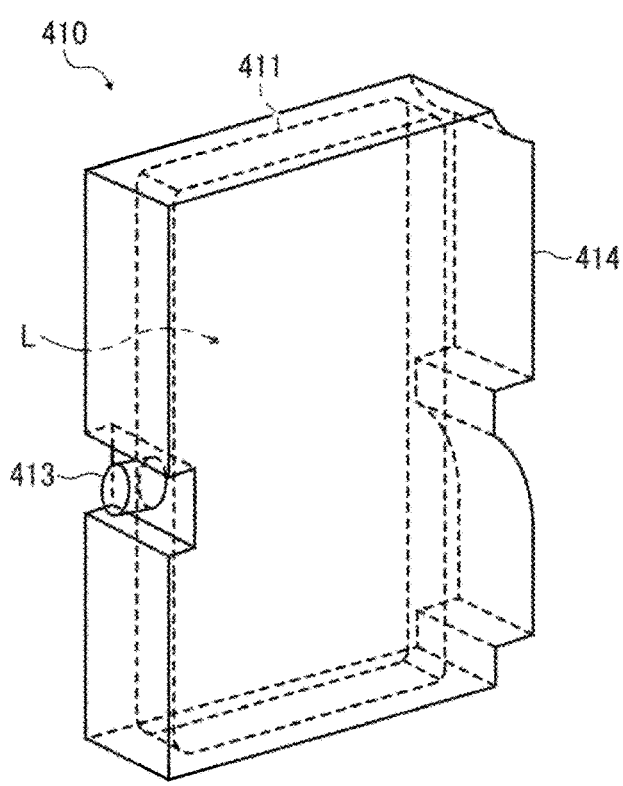
FIG. 2 is a diagram illustrating a perspective view of an example of a tank of an inkjet recording device.

The recording device is described using an example with reference to FIG. 1 and FIG. 2. FIG. 1 is a diagram illustrating a perspective view of the recording device. FIG. 2 is a diagram illustrating a perspective view of a tank. An image forming device 400, which is an embodiment of the recording device, is a serial type image forming device. A mechanical assembly 420 is disposed in an exterior 401 of the image forming device 400. Each ink accommodating unit (container) 411 of each tank (ink accommodating unit) 410 (410k, 410c, 410m, and 410y) for each color of black (K), cyan (C), magenta (M), and yellow (Y) is made of, for example, a packaging member such as aluminum laminate film. The ink accommodating unit 411 is housed in, for example, a plastic container housing unit 414 and L represents liquid contained in the ink accommodating unit 411. As a result, the tank 410 is used as an ink cartridge of each color. It can be used as a pre-processing fluid container that contains the pre-processing fluid or a white ink container that contains the white ink.

Figure 3:
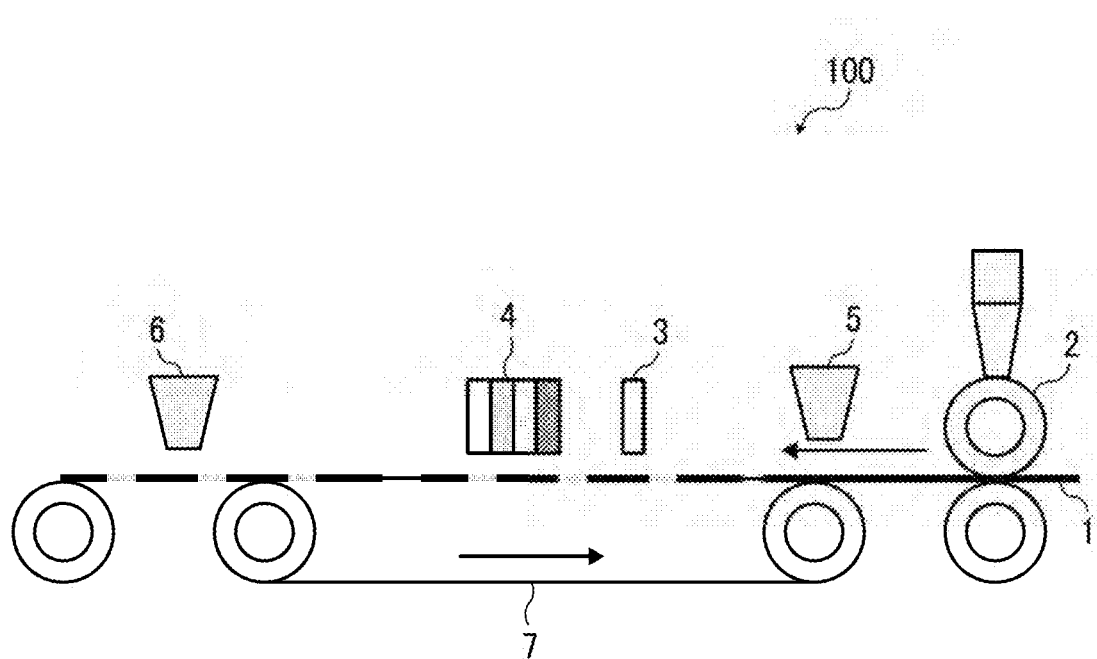
FIG. 3 is a schematic diagram illustrating an example of an inkjet printing device according to an embodiment of the present disclosure for use in the inkjet printing method according to an embodiment of the present disclosure.

A cartridge holder 404 is disposed on the rear side of the opening formed when a cover 401c is opened. The cartridge holder 404 is detachably attached to the tank 410. In this configuration, each ink discharging outlet 413 of the tank 410 communicates with a discharging head 434 for each color via a supplying tube 436 for each color and the ink can be discharged from the discharging head 434 to a recording medium. FIG. 3 is a schematic diagram illustrating an example of the inkjet printer for use in the inkjet printing method of the present disclosure. An inkjet printing device 100 illustrated in FIG. 3 includes an applicator 2 to apply a processing fluid such as a pre-processing fluid, a white ink discharging head 3 to discharge a white ink (W), a first ink (color ink) discharging head 4 to discharge a black ink (K), a cyan ink (C), a magenta ink (M), and a yellow ink (Y) as the first ink, a first drier 5, a second drier 6, and a conveyor belt 5 to convey a recording medium 1. The first drier 5 is optionally deposited between the applicator 2 and the white ink discharging head 3. It is not always necessary to dry the applied processing fluid with the optional first drier 5. The second drier 6 is optionally and preferably deposited downstream of the yellow ink (Y) discharging head of the first ink (color ink) discharging head 4 and dry the first ink to prevent friction and adhesion to the rear side of the recording medium 1.

Notably, the ink is applicable not only to the inkjet recording but can be widely applied in other methods.

Specific examples of such methods other than the inkjet recording include, but are not limited to, blade coating methods, gravure coating methods, bar coating methods, roll coating methods, dip coating methods, curtain coating methods, slide coating methods, die coating methods, and spray coating methods.

The usage of the ink of the present disclosure is not particularly limited and can be suitably selected to suit to a particular application. For example, the ink can be used for printed matter, a paint, a coating material, and foundation. The ink can be used to produce two-dimensional text and images and furthermore used as a material for solid fabrication for manufacturing a solid fabrication object (or solid freeform fabrication object).

The solid fabrication apparatus to fabricate a solid fabrication object can be any known device with no particular limit. For example, the apparatus includes a container, supplying device, discharging device, drier of ink, and others. The solid fabrication object includes an object manufactured by repetitively coating ink. In addition, the solid fabrication object includes a mold-processed product manufactured by processing a structure having a substrate such as a recording medium to which the ink is applied. The molded processed product is manufactured from recorded matter or a structure having a form such as a sheet-like form, and film-like form. by, processing such as heating drawing or punching. The molded processed product is suitably used for articles which are molded after surface-decorating. Examples are gauges or operation panels of vehicles, office machines, electric and electronic devices, cameras. etc.

Terms such as image forming, recording, printing, and print used in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but not limited thereto. Parts represents parts by mass.

Preparation Example 1 of Pigment Dispersion

Preparation of Black Pigment Dispersion

After the following recipe was preliminarily mixed, the mixture was subjected to circulation dispersion for seven hours with a disk type bead mill (KDL type, media: zirconia ball having a diameter of 0.3 mm, manufactured by SHIN-MARU ENTERPRISES CORPORATION) to obtain a black pigment dispersion (pigment concentration: 15 percent by mass).

Carbon black pigment (Monarch 800, manufactured by Cabot Corporation): 15 parts
Anionic surfactant (Pionine A-51-B, manufactured by TAKEMOTO OIL & FAT Co., Ltd.): 2 parts
Deionized water: 83 parts Preparation of Liquid Dispersion 1 of White Pigment A total of 40 parts of titanium oxide (JR-405, manufactured by TAYCA CORPORATION), 5 parts of a pigment dispersant (TEGO Dispers 651, manufactured by Evonik Japan Co., Ltd.), and 55 parts of water were mixed followed by dispersion at 8 m/s for five minutes using a bead mill (Research Labo, manufactured by Shinmaru Enterprises Corporation) with zirconia beads having 0.3 mm diameter with a filling ratio of 60 percent to obtain a liquid dispersion 1 of white pigment.

The volume average particle diameter D50 of the liquid dispersion 1 of white pigment was measured with Nanotrac Wave-EX1500. It was 210 nm.

Manufacturing of Liquid Dispersion of Resin Particle

A liquid dispersion 1 of resin particles was synthesized as follows. First, 31 parts of polyethylene glycol (PEG-2000, number average molecular weight of 2,000, manufactured by Sanyo Chemical Industries, Ltd.) as polyol, 73 parts of polycarbonate diol (T5651, manufactured by Asahi Kasei Chemicals Corporation), 32 parts of isophorone diisocyanate, and 90 parts of acetone dehydrated by a molecular sieve were placed in a 500 mL separable flask equipped with a stirrer, a thermometer, and an efflux tube followed by heating to 70 degrees C. in a nitrogen atmosphere. Thereafter, 200 ppm of tin 2-ethyl hexanoate was added to the obtained mixture to allow reaction at 70 degrees C. for three to ten hours while the concentration of isocyanate in the system was measured. The temperature in the system was lowered to 40 degrees C. and triethyl amine was optionally added. A total of 270 parts of deionized water was added while the entire was stirred at 300 rpm. Subsequent to one hour stirring, 4.5 parts of 2-methyl-1,5-pentane diamine was added followed by stirring for three to six hours. Thereafter, the resulting liquid was cooled down to room temperature followed by distilling away the solvent by an evaporator. The proportion of the solid portion was adjusted with deionized water was 30 percent to obtain a liquid dispersion of urethane resin particles having a structural unit represented by Chemical Formula 1.

A liquid dispersion 2 of resin particles was synthesized as follows. First, 52 parts of polycaprolactone (PCL 210, manufactured by Daicel Corporation) as polyol, 7 parts of dimethylol propionic acid, 30 parts of isophorone diisocyanate, and 90 parts of acetone dehydrated by a molecular sieve were placed in a 500 mL separable flask equipped with a stirrer, a thermometer, and an efflux tube followed by heating to 70 degrees C. in a nitrogen atmosphere. Thereafter, 200 ppm of tin 2-ethyl hexanoate was added to the obtained mixture to allow reaction at 70 degrees C. for three to ten hours while the concentration of isocyanate in the system was measured. The temperature in the system was lowered to 40 degrees C. and triethyl amine was optionally added. A total of 270 parts of deionized water was added while the entire was stirred at 300 rpm. Subsequent to one hour stirring, 2 parts of diethylene triamine was added followed by stirring for three to six hours. Thereafter, the resulting liquid was cooled down to room temperature followed by distilling away the solvent by an evaporator. Deionized water was added such that the solid portion was 30 percent to obtain a liquid dispersion 2 of resin particle.

A liquid dispersion 3 of resin particles was synthesized as follows. First, 70.0 parts of deionized water was charged in a 300 mL flask equipped with a stirrer, a thermometer, a nitrogen gas introducing tube, and a reflux tube, and the temperature was raised to and kept at 70 degrees C. in a nitrogen atmosphere. A total of 21.6 parts of methyl methacrylate, 44 parts of 2-ethylhexyl acrylate, 7.6 part of methoxy polyethylene glycol methacrylate (n=23), 2.5 parts of vinyltriethoxy silane, 1.2 parts of AQUALON HS-10 (manufactured by DKS Co., Ltd.), and 34.4 parts of deionized water were mixed to emulsify the mixture with a homomixer to prepare an emulsification. Next, 3.0 parts of an aqueous solution of AQUALON HS-10 at 10 percent and 2.1 parts of an aqueous solution of ammonium persulfate at 5 percent were added followed by continuously adding the emulsification dropwise in 2.5 hours. In addition, 0.4 parts of an aqueous solution of ammonium persulfate at 5 percent by mass was added every hour until three hours had passed since the initiation of the addition dropwise. Subsequent to a two-hour aging at 70 degrees C. after the dripping completed, the resulting liquid was cooled down to adjust pH to 7 to 8 with ammonium water at 28 percent and a solid portion of 30 percent with deionized water to obtain a liquid dispersion 3 of resin particle.

A liquid dispersion 4 of resin particles was synthesized as follows. A total of 60 parts of polycarbonate polyol (DRURANOL™ T5651, manufactured by Asahi Kasei Chemicals Corporation) having a number average molecular weight (Mn) of 1,000, 8 parts of dimethylol propionic acid, 48 parts of dicyclohexyl methane diisocyanate, and 112 parts of acetone dehydrated by a molecular sieve were placed in a four-necked flask equipped with a stirrer, an efflux condenser, a thermometer, and a nitrogen blowing tube followed by heating to 70 degrees C. in a nitrogen atmosphere. Thereafter, 200 ppm of tin 2-ethyl hexanoate was added to the obtained mixture to allow reaction at 70 degrees C. for three to ten hours while the concentration of isocyanate in the system was measured. The temperature in the system was lowered to 40 degrees C. and triethyl amine was optionally added. A total of 360 parts of deionized water was added while the entire was stirred at 300 rpm. Subsequent to one hour stirring, 2 parts of diethylene triamine was added followed by stirring for three to six hours. Thereafter, the resulting liquid was cooled down to room temperature followed by distilling away the solvent by an evaporator. Deionized water was added such that the solid portion was 30 percent to obtain a liquid dispersion 4 of resin particle.

Example

Preparation of Pre-Processing Fluid and Ink

The recipes shown in Table 1 to 3 were mixed and stirred for one hour. The resulting mixture was filtered with a 1.2 μm cellulose acetate membrane filter under a pressure to obtain pre-processing fluids and inks. Deionized water was added to make the total 100 parts.

TABLE 1

| Pre-processing fluid | Solvent 1 | | Solvent 2 | | Surfactant | |
|---|---|---|---|---|---|---|
| | Type | Parts | Type | Parts | Type | Parts |
| Pre-processing fluid 1 | Propylene glycol | 5 | | | BYK348 | 0.02 |
| Pre-processing fluid 2 | Propylene glycol | 5 | | | BYK348 | 0.50 |
| Pre-processing fluid 3 | Propylene glycol | 5 | | | BYK348 | 1.00 |
| Pre-processing fluid 4 | Propylene glycol | 5 | | | BYK348 | 0.02 |
| Pre-processing fluid 5 | Propylene glycol | 5 | | | BYK348 | 0.2 |
| Pre-processing fluid 6 | Propylene glycol | 5 | | | BYK348 | 0.02 |
| Pre-processing fluid 7 | Propylene glycol | 5 | | | BYK348 | 0.02 |
| Pre-processing fluid 8 | Propylene glycol | 5 | | | BYK348 | 0.02 |
| Pre-processing fluid 9 | Propylene glycol | 5 | | | BYK348 | 0.02 |

TABLE 1-continued

| Pre-processing fluid | | | | | | |
|---|---|---|---|---|---|---|
| Pre-processing fluid 10 | Propylene glycol | 5 | | | SAG503A | 0.001 |
| Pre-processing fluid 11 | Propylene glycol | 5 | | | SAG503A | 0.01 |
| Pre-processing fluid 12 | Propylene glycol | 5 | | | Surfynol 465 | 0.02 |
| Pre-processing fluid 13 | Glycerin | 3 | — | — | BYK348 | 0.02 |
| Pre-processing fluid 14 | Glycerin | 3 | Propylene glycol | 3 | BYK348 | 0.02 |
| Pre-processing fluid 15 | — | 0 | — | — | BYK348 | 0.02 |
| Pre-processing fluid 16 | Propylene glycol | 5 | | | BYK348 | 0.02 |
| Pre-processing fluid 17 | Propylene glycol | 5 | | | BYK348 | 0.02 |
| Pre-processing fluid 18 | Propylene glycol | 5 | | | BYK348 | 0.02 |

| Pre-processing fluid | Metal salt | | Resin | | Deionized water |
|---|---|---|---|---|---|
| | Type | Parts | Type | Parts | Parts |
| Pre-processing fluid 1 | Ca(NO$_3$)$_2$•4H$_2$O | 10 | | | Balance |
| Pre-processing fluid 2 | Ca(NO$_3$)$_2$•4H$_2$O | 10 | | | Balance |
| Pre-processing fluid 3 | Ca(NO$_3$)$_2$•4H$_2$O | 10 | | | Balance |
| Pre-processing fluid 4 | Ca(NO$_3$)$_2$•4H$_2$O | 10 | Liquid dispersion 1 of resin particle | 5 | Balance |
| Pre-processing fluid 5 | | | | | Balance |
| Pre-processing fluid 6 | CaCl$_2$•2H$_2$O | 1.5 | | | Balance |
| Pre-processing fluid 7 | CaCl$_2$•2H$_2$O | 3 | | | Balance |
| Pre-processing fluid 8 | CaCl$_2$•2H$_2$O | 7 | | | Balance |
| Pre-processing fluid 9 | CaCl$_2$•2H$_2$O | 11 | | | Balance |
| Pre-processing fluid 10 | Ca(NO$_3$)$_2$•4H$_2$O | 10 | | | Balance |
| Pre-processing fluid 11 | Ca(NO$_3$)$_2$•4H$_2$O | 10 | | | Balance |
| Pre-processing fluid 12 | Ca(NO$_3$)$_2$•4H$_2$O | 10 | | | Balance |
| Pre-processing fluid 13 | Ca(NO$_3$)$_2$•4H$_2$O | 10 | | | Balance |
| Pre-processing fluid 14 | Ca(NO$_3$)$_2$•4H$_2$O | 10 | | | Balance |
| Pre-processing fluid 15 | Ca(NO$_3$)$_2$•4H$_2$O | 10 | | | Balance |

TABLE 1-continued

| Pre-processing fluid 16 | Ca(NO$_3$)$_2$•4H$_2$O | 10 | Liquid dispersion 1 of resin particle | 0.1 | Balance |
|---|---|---|---|---|---|
| Pre-processing fluid 17 | Ca(NO$_3$)$_2$•4H$_2$O | 10 | Liquid dispersion 1 of resin particle | 15 | Balance |
| Pre-processing fluid 18 | Ca(NO$_3$)$_2$•4H$_2$O | 10 | Liquid dispersion 3 of resin particle | 5 | Balance |

TABLE 2

| Second ink | Solvent 1 | | Solvent 2 | | Surfactant | |
|---|---|---|---|---|---|---|
| | Type | Parts | Type | Parts | Type | Parts |
| White ink 1 | Glycerin | 20 | DEGMBE | 4 | SAG503A | 0.10 |
| White ink 2 | Glycerin | 20 | DEGMBE | 2 | SAG503A | 0.10 |
| White ink 3 | Glycerin | 20 | DEGMBE | 1 | SAG503A | 0.10 |
| White ink 4 | Glycerin | 20 | DEGMBE | 0 | SAG503A | 0.10 |
| White ink 5 | Glycerin | 20 | DEGMBE | 0 | SAG503A | 0.05 |
| White ink 6 | Glycerin | 25 | DEGMBE | 4 | SAG503A | 0.10 |
| White ink 7 | Glycerin | 30 | DEGMBE | 4 | SAG503A | 0.10 |
| White ink 8 | Glycerin | 20 | DEGMBE | 1 | SAG503A | 0.10 |
| White ink 9 | Glycerin | 20 | DEGMBE | 1 | SAG503A | 0.10 |
| White ink 10 | Glycerin | 20 | DEGMBE | 4 | SAG503A | 0.30 |
| White ink 11 | Glycerin | 20 | DEGMBE | 1 | BYK348 | 0.10 |
| White ink 12 | Glycerin | 20 | Solfit MMB | 5 | SAG503A | 0.10 |
| White ink 13 | Glycerin | 20 | Propylene glycol | 10 | SAG503A | 0.10 |
| White ink 14 | Glycerin | 20 | DEGMBE | 1 | SAG503A | 0.10 |

| Second ink | Pigment | | Resin | | Deionized water | 150 ms surface tension |
|---|---|---|---|---|---|---|
| | Type | Parts | Type | Parts | Parts | mN/m |
| White ink 1 | Dispersion of white pigment | 25 | Liquid dispersion 2 of resin particle | 20 | Balance | 35 |
| White ink 2 | Dispersion of white pigment | 25 | Liquid dispersion 2 of resin particle | 20 | Balance | 42 |
| White ink 3 | Dispersion of white pigment | 25 | Liquid dispersion 2 of resin particle | 20 | Balance | 48 |
| White ink 4 | Dispersion of white pigment | 25 | Liquid dispersion 2 of resin particle | 20 | Balance | 53 |
| White ink 5 | Dispersion of white pigment | 25 | Liquid dispersion 2 of resin particle | 20 | Balance | 58 |
| White ink 6 | Dispersion of white pigment | 25 | Liquid dispersion 2 of resin particle | 20 | Balance | 36 |
| White ink 7 | Dispersion of white pigment | 25 | Liquid dispersion 2 of resin particle | 20 | Balance | 38 |
| White ink 8 | Dispersion of white pigment | 33 | Liquid dispersion 2 of resin particle | 20 | Balance | 46 |
| White ink 9 | Dispersion of white pigment | 40 | Liquid dispersion 2 of resin particle | 20 | Balance | 45 |
| White ink 10 | Dispersion of white pigment | 25 | Liquid dispersion 2 of resin particle | 20 | Balance | 33 |
| White ink 11 | Dispersion of white pigment | 25 | Liquid dispersion 2 of resin particle | 20 | Balance | 50 |
| White ink 12 | Dispersion of white pigment | 25 | Liquid dispersion 2 of resin particle | 20 | Balance | 49 |
| White ink 13 | Dispersion of white pigment | 25 | Liquid dispersion 2 of resin particle | 20 | Balance | 51 |
| White ink 14 | Dispersion of white pigment | 25 | Liquid dispersion 4 of resin particle | 20 | Balance | 49 |

Note:
DEGMBE represents diethylene glycol monobutyl ether and 150 ms surface tension represents surface tension at 25 degrees C. and a life time of 150 ms

TABLE 3

| First ink | Solvent 1 | | Solvent 2 | | Surfactant | |
|---|---|---|---|---|---|---|
| | Type | Parts | Type | Parts | Type | Parts |
| Black ink 1 | Glycerin | 30 | DEGMBE | 4 | SAG503A | 0.10 |
| Black ink 2 | Glycerin | 30 | DEGMBE | 2 | SAG503A | 0.10 |

TABLE 3-continued

| | | | | | | |
|---|---|---|---|---|---|---|
| Black ink 3 | Glycerin | 30 | DEGMBE | 1 | SAG503A | 0.10 |
| Black ink 4 | Glycerin | 30 | DEGMBE | 0 | SAG503A | 0.10 |
| Black ink 5 | Glycerin | 30 | DEGMBE | 0 | SAG503A | 0.07 |
| Black ink 6 | Glycerin | 30 | DEGMBE | 0 | SAG503A | 0.05 |
| Black ink 7 | Glycerin | 30 | DEGMBE | 4 | SAG503A | 0.30 |
| Black ink 8 | Glycerin | 30 | DEGMBE | 1 | BYK348 | 0.10 |
| Black ink 9 | Glycerin | 30 | DEGMBE | 1 | Surfynol 465 | 0.10 |
| Black ink 10 | Glycerin | 30 | DEGMBE | 1 | SAG503A | 0.01 |
| Black ink 11 | Glycerin | 30 | DEGMBE | 1 | SAG503A | 0.02 |
| Black ink 12 | Glycerin | 30 | DEGMBE | 0 | SAG503A | 0.50 |
| Black ink 13 | Glycerin | 30 | Solfit MMB | 5 | SAG503A | 0.10 |
| Black ink 14 | Glycerin | 30 | Propylene glycol | 10 | SAG503A | 0.10 |
| Black ink 15 | Glycerin | 30 | DEGMBE | 1 | SAG503A | 0.10 |

| First ink | Pigment Type | Parts | Resin Type | Parts | Deionized water Parts | 150 ms surface tension mN/m | Coloring |
|---|---|---|---|---|---|---|---|
| Black ink 1 | Dispersion of black pigment | 33 | Liquid dispersion 2 of resin particle | 20 | Balance | 36 | A |
| Black ink 2 | Dispersion of black pigment | 33 | Liquid dispersion 2 of resin particle | 20 | Balance | 43 | A |
| Black ink 3 | Dispersion of black pigment | 33 | Liquid dispersion 2 of resin particle | 20 | Balance | 47 | A |
| Black ink 4 | Dispersion of black pigment | 33 | Liquid dispersion 2 of resin particle | 20 | Balance | 53 | A |
| Black ink 5 | Dispersion of black pigment | 33 | Liquid dispersion 2 of resin particle | 20 | Balance | 53 | A |
| Black ink 6 | Dispersion of black pigment | 33 | Liquid dispersion 2 of resin particle | 20 | Balance | 59 | A |
| Black ink 7 | Dispersion of black pigment | 33 | Liquid dispersion 2 of resin particle | 20 | Balance | 34 | A |
| Black ink 8 | Dispersion of black pigment | 33 | Liquid dispersion 2 of resin particle | 20 | Balance | 45 | A |
| Black ink 9 | Dispersion of black pigment | 33 | Liquid dispersion 2 of resin particle | 20 | Balance | 55 | C |
| Black ink 10 | Dispersion of black pigment | 33 | Liquid dispersion 2 of resin particle | 20 | Balance | 62 | B |
| Black ink 11 | Dispersion of black pigment | 33 | Liquid dispersion 2 of resin particle | 20 | Balance | 61 | A |

TABLE 3-continued

| | | | | | | | | |
|---|---|---|---|---|---|---|---|---|
| Black ink 12 | Dispersion of black pigment | 33 | Liquid dispersion 2 of resin particle | 20 | Balance | 38 | B | |
| Black ink 13 | Dispersion of black pigment | 33 | Liquid dispersion 2 of resin particle | 20 | Balance | 46 | A | |
| Black ink 14 | Dispersion of black pigment | 33 | Liquid dispersion 2 of resin particle | 20 | Balance | 47 | A | |
| Black ink 15 | Dispersion of black pigment | 33 | Liquid dispersion 4 of resin particle | 20 | Balance | 48 | A | |

Note:
DEGMBE represents diethylene glycol monobutyl ether and 150 ms surface tension represents surface tension at 25 degrees C. and a life time of 150 ms.

The dynamic surface tensions of the ink shown in the Tables were measured at 25 degrees C., 50 percent RH, and a surface life time of 150 msec by SITA_DynoTester (manufactured by SITA Messtechnik GmbH) according to maximum bubble pressure technique.

The materials in the Tables represent the following.

SAG503A: Silicone surfactant illustrated by Chemical Formula 2 (Silface SAG503A, manufactured by Nissin Chemical co., ltd.)

BYK348: Silicone surfactant illustrated by Chemical Formula 2 (BYK-348, manufactured by BYK Japan KK.)

Acetylene glycol-based surfactant (Surfynol 465, manufactured by Nisshin Chemical co., ltd.)

Print Method 1

A white cotton T-shirt manufactured by TOMS CO., LTD. was dried for five seconds with a heat press at 160 degrees C. This dried and pressed T-shirt was set in Ri 6000 (manufactured by Ricoh Co., Ltd.) and this inkjet printer was filled with white ink and black ink. A 1 cm×1 cm solid image was created on the T-shirt with the black ink with an amount attached of 2.0 mg/cm². This print method 1 was applied to the following coloring test.

Print Method 2

The pre-processing fluid was sprayed at an amount attached at 20 g/A4 onto a black cotton T-shirt manufactured by TOMS CO., LTD. followed by drying with a heat press set at 160 degrees C. for one minute.

The dried and pressed black T-shirt treated with the pre-processing fluid was set in Ri 6000 (manufactured by Ricoh Co., Ltd.) and this inkjet printer was filled with white ink and black ink. Five seconds after a 2 cm×3 cm solid image was printed on the T-shirt with an amount attached at 20.0 mg/cm², another image was printed with the black ink at 2.0 mg/cm² on the white ink layer to form a 1 cm×1 cm black solid image portion. This print method 2 was applied to the following white concealing ability and blurring testing.

Coloring

The black solid image created on the white cotton T-shirt manufactured by TOMS CO., LTD. was subjected to color measuring using an X-rite exact to obtain optical density (OD).

Evaluation Criteria

A: OD was 1.30 or higher
B: OD was 1.25 or higher
C: OD was 1.20 or higher
D: OD was less than 1.20
Grade A to C are acceptable.

White Concealing Ability

The solid image of the white ink layer alone created on the black cotton T-shirt manufactured by TOMS CO., LTD. was subjected to color measuring using an X-rite exact to calculate white concealing ability according to the following relationship.

White Concealing Ability=(OD of original fabric−OD of solid image)/(OD of original fabric)×100 (percent)

Evaluation Criteria

A: White concealing was 93 percent or greater
B: White concealing was from 88 to less than 93 percent
C: White concealing was from 85 to less than 88 percent
D: White concealing was from 80 to less than 85 percent
E: White concealing was from 70 to less than 80 percent
Grade A to C are acceptable.

Blurring

The boundary between the solid image portion of the white ink layer and the solid black image portion on the white ink layer was evaluated according to the following evaluation criteria.

Evaluation Criteria

A: No disturbance at the boundary
B: One or two disturbances at the boundary
C: Three of four disturbances at the boundary
B: Five or more disturbances at the boundary
Grade A to C are acceptable.

The results are shown in Tables 3 and 4.

TABLE 4

| | Pre-processing fluid | White Ink | 150 ms surface tension (mN/m) | Black ink |
|---|---|---|---|---|
| Example 1 | Pre-processing fluid 1 | White ink 1 | 35 | Black ink 1 |
| Example 2 | Pre-processing fluid 1 | White ink 2 | 42 | Black ink 2 |
| Example 3 | Pre-processing fluid 1 | White ink 3 | 48 | Black ink 3 |
| Example 4 | Pre-processing fluid 1 | White ink 4 | 53 | Black ink 4 |

TABLE 4-continued

| Example | Pre-processing fluid | White ink | | Black ink |
|---|---|---|---|---|
| Example 5 | Pre-processing fluid 1 | White ink 5 | 58 | Black ink 5 |
| Example 6 | Pre-processing fluid 1 | White ink 3 | 48 | Black ink 2 |
| Example 7 | Pre-processing fluid 1 | White ink 3 | 48 | Black ink 4 |
| Example 8 | Pre-processing fluid 1 | White ink 3 | 48 | Black ink 5 |
| Example 9 | Pre-processing fluid 1 | White ink 3 | 48 | Black ink 6 |
| Example 10 | Pre-processing fluid 2 | White ink 3 | 48 | Black ink 3 |
| Example 11 | Pre-processing fluid 3 | White ink 3 | 48 | Black ink 3 |
| Example 12 | Pre-processing fluid 4 | White ink 3 | 48 | Black ink 3 |
| Example 13 | Pre-processing fluid 1 | White ink 6 | 36 | Black ink 3 |
| Example 14 | Pre-processing fluid 1 | White ink 7 | 38 | Black ink 3 |
| Example 15 | Pre-processing fluid 1 | White ink 8 | 46 | Black ink 3 |
| Example 16 | Pre-processing fluid 1 | White ink 9 | 45 | Black ink 3 |
| Example 17 | Pre-processing fluid 1 | White ink 3 | 48 | Black ink 8 |
| Example 18 | Pre-processing fluid 1 | White ink 3 | 48 | Black ink 9 |
| Example 19 | Pre-processing fluid 1 | White ink 3 | 48 | Black ink 10 |
| Example 20 | Pre-processing fluid 1 | White ink 3 | 48 | Black ink 11 |
| Example 21 | Pre-processing fluid 1 | White ink 3 | 48 | Black ink 12 |
| Example 22 | Pre-processing fluid 1 | White ink 3 | 48 | Black ink 13 |
| Example 23 | Pre-processing fluid 1 | White ink 3 | 48 | Black ink 14 |
| Example 24 | Pre-processing fluid 1 | White ink 3 | 48 | Black ink 15 |
| Example 25 | Pre-processing fluid 1 | White ink 11 | 50 | Black ink 3 |
| Example 26 | Pre-processing fluid 1 | White ink 12 | 49 | Black ink 3 |
| Example 27 | Pre-processing fluid 1 | White ink 13 | 51 | Black ink 3 |
| Example 28 | Pre-processing fluid 1 | White ink 14 | 49 | Black ink 3 |
| Example 29 | Pre-processing fluid 6 | White ink 3 | 48 | Black ink 3 |
| Example 30 | Pre-processing fluid 7 | White ink 3 | 48 | Black ink 3 |
| Example 31 | Pre-processing fluid 8 | White ink 3 | 48 | Black ink 3 |
| Example 32 | Pre-processing fluid 9 | White ink 3 | 48 | Black ink 3 |
| Example 33 | Pre-processing fluid 10 | White ink 3 | 48 | Black ink 3 |
| Example 34 | Pre-processing fluid 11 | White ink 3 | 48 | Black ink 3 |
| Example 35 | Pre-processing fluid 12 | White ink 3 | 48 | Black ink 3 |
| Example 36 | Pre-processing fluid 13 | White ink 3 | 48 | Black ink 3 |
| Example 37 | Pre-processing fluid 14 | White ink 3 | 48 | Black ink 3 |
| Example 38 | Pre-processing fluid 15 | White ink 3 | 48 | Black ink 3 |
| Example 39 | Pre-processing fluid 16 | White ink 3 | 48 | Black ink 3 |
| Example 40 | Pre-processing fluid 17 | White ink 3 | 48 | Black ink 3 |
| Example 41 | Pre-processing fluid 18 | White ink 3 | 48 | Black ink 3 |
| Comparative Example 1 | Pre-processing fluid 5 | White ink 3 | 48 | Black ink 3 |
| Comparative Example 2 | Pre-processing fluid 1 | White ink 10 | 33 | Black ink 3 |
| Comparative Example 3 | Pre-processing fluid 1 | White ink 3 | 48 | Black ink 7 |

| | 150 ms surface tension (mN/m) | Difference between dynamic surface tensions at 150 ms (mN/m) | White concealing ability | Blurring |
|---|---|---|---|---|
| Example 1 | 36 | 1 | C | A |
| Example 2 | 43 | 1 | B | A |
| Example 3 | 47 | −1 | A | B |
| Example 4 | 53 | 0 | A | A |
| Example 5 | 55 | −3 | A | B |
| Example 6 | 43 | −5 | A | B |
| Example 7 | 53 | 5 | A | A |
| Example 8 | 55 | 7 | A | B |
| Example 9 | 59 | 11 | A | C |
| Example 10 | 47 | −1 | B | B |
| Example 11 | 47 | −1 | C | B |
| Example 12 | 47 | −1 | A | B |
| Example 13 | 47 | 11 | C | C |
| Example 14 | 47 | 9 | C | B |
| Example 15 | 47 | 1 | A | A |
| Example 16 | 47 | 2 | A | A |
| Example 17 | 45 | −3 | A | B |
| Example 18 | 55 | 7 | A | B |
| Example 19 | 62 | 14 | A | C |
| Example 20 | 61 | 13 | A | C |
| Example 21 | 38 | −10 | A | C |
| Example 22 | 46 | −2 | A | B |
| Example 23 | 47 | −1 | A | B |
| Example 24 | 48 | 0 | A | A |
| Example 25 | 47 | −3 | A | B |
| Example 26 | 47 | −2 | A | B |
| Example 27 | 47 | −4 | A | B |
| Example 28 | 47 | −2 | A | B |
| Example 29 | 47 | −1 | B | B |
| Example 30 | 47 | −1 | A | B |
| Example 31 | 47 | −1 | A | B |
| Example 32 | 47 | −1 | B | A |

TABLE 4-continued

| | | | | |
|---|---|---|---|---|
| Example 33 | 47 | −1 | B | B |
| Example 34 | 47 | −1 | A | B |
| Example 35 | 47 | −1 | B | C |
| Example 36 | 47 | −1 | A | B |
| Example 37 | 47 | −1 | A | B |
| Example 38 | 47 | −1 | A | B |
| Example 39 | 47 | −1 | A | B |
| Example 40 | 47 | −1 | A | B |
| Example 41 | 47 | −1 | A | B |
| Comparative Example 1 | 47 | −1 | E | C |
| Comparative Example 2 | 47 | 14 | D | D |
| Comparative Example 3 | 34 | −14 | A | D |

Note:
150 ms surface tension (mN/m) means surface tension at 25 degrees C. and 150 ms As seen in the results shown in Tables 3 and 4, each Example is acceptable regarding the coloring, white concealing ability, and blurring while the white concealing ability and blurring of are not acceptable in Comparative Examples. Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not t) be regarded as a departure from the scope of the present disclosure and appended claims, and all such modifications are intended to be included within the scope of the present disclosure and appended claims.

What is claimed is:

1. An ink set comprising:
a pre-processing fluid comprising a multivalent metal ion;
a first ink; and
a second ink,
wherein the first ink has a surface tension of greater than 35 mN/m at 25 degrees C. and a life time of 150 ms,
wherein the second ink has a surface tension of greater than 35 mN/m at 25 degrees C. and a life time of 150 ms
wherein the second ink is a white ink.

2. The ink set according to claim 1, wherein the surface tension at 25 degrees C. and a life time of 150 ms of the first ink is equal to or greater than the surface tension at 25 degrees C. and a life time of 150 ms of the second ink.

3. The ink set according to claim 1, wherein a difference between the surface tension at 25 degrees C. and a life time of 150 ms of the first ink and the surface tension at 25 degrees C. and a life time of 150 ms of the second ink is 10 mN/m or less.

4. The ink set according to claim 1, wherein a difference between the surface tension at 25 degrees C. and a life time of 150 ms of the first ink and the surface tension at 25 degrees C. and a life time of 150 ms of the second ink is 5 mN/m or less.

5. The ink set according to claim 1, wherein the pre-processing fluid contains a silicone-based surfactant in an amount of from 0.001 to 1.000 percent by mass.

6. The ink set according to claim 1, wherein the surface tension at 25 degrees C. and a life time of 150 ms of the second ink is 40 mN/m or greater.

7. The ink set according to claim 1, wherein the first ink contains a silicone-based surfactant.

8. An inkjet printing device comprising:
at least one container containing the ink set; of claim 1;
an applicator configured to apply the pre-processing fluid; and
at least one discharging device configured to discharge the first ink and the second ink.

9. The ink set according to claim 1, wherein the multivalent metal ion is at least one ion selected from the group consisting of a calcium ion, a magnesium ion, and an aluminum ion.

10. The ink set according to claim 1, wherein the multivalent metal ion is comprises at least one calcium ion.

11. The ink set according to claim 1, wherein the multivalent metal ion is present as at least one multivalent metal salt selected from the group consisting of a multivalent metal carboxylic acid salt, a multivalent metal sulfate salt, a multivalent metal nitrate salt, a multivalent metal hydrochloride salt, and a multivalent metal thiocyanate salt.

12. The ink set according to claim 1, wherein the multivalent metal ion is present as at least one multivalent metal salt selected from the group consisting of a multivalent metal nitrate salt and a multivalent metal hydrochloride salt.

13. The ink set according to claim 1, wherein a content of the multivalent metal ion is from 2 to 40 g/L, with respect to a volume of the pre-processing fluid.

14. An inkjet printing method comprising:
applying a pre-processing fluid comprising a multivalent metal ion to a recording medium;
discharging a first ink and a second ink to a portion where the pre-processing fluid has been applied to the recording medium,
wherein the first ink has a surface tension of greater than 35 mN/m at 25 degrees C. and a life time of 150 ms,
wherein the second ink has a surface tension of greater than 35 mN/m at 25 degrees C. and a life time of 150 ms
wherein the second ink is a white ink.

* * * * *